(12) United States Patent
Bellabal et al.

(10) Patent No.: US 9,067,688 B2
(45) Date of Patent: Jun. 30, 2015

(54) TURBOSHAFT ENGINE ATTACHED TO A PYLON OF THE FUSELAGE OF AN AIRCRAFT BY A FAILSAFE SUSPENSION SYSTEM

(75) Inventors: Francois Bellabal, Fontainebleau (FR); Guilhem Seize, Cachan (FR); Thomas Vincent, Palaiseau (FR)

(73) Assignee: SNECMA, Paris (FR)

( * ) Notice: Subject to any disclaimer, the term of this patent is extended or adjusted under 35 U.S.C. 154(b) by 159 days.

(21) Appl. No.: 13/703,969

(22) PCT Filed: Jun. 9, 2011

(86) PCT No.: PCT/FR2011/051322
§ 371 (c)(1),
(2), (4) Date: Dec. 13, 2012

(87) PCT Pub. No.: WO2011/157931
PCT Pub. Date: Dec. 22, 2011

(65) Prior Publication Data
US 2013/0099051 A1   Apr. 25, 2013

(30) Foreign Application Priority Data
Jun. 14, 2010   (FR) .................................... 10 54689

(51) Int. Cl.
*B64D 27/26* (2006.01)
*B64D 27/14* (2006.01)
(52) U.S. Cl.
CPC .............. *B64D 27/26* (2013.01); *B64D 27/14* (2013.01)
(58) Field of Classification Search
CPC .. B64D 27/14; B64D 27/26; B64D 2027/266; B64D 27/20; B64D 2041/002
USPC .......... 244/54, 55; 248/554–557; 60/796–797
See application file for complete search history.

(56) References Cited

U.S. PATENT DOCUMENTS 3,342,438 A * 9/1967 Steele .............................. 244/54
3,690,639 A * 9/1972 Brandon et al. .............. 267/282

(Continued)

FOREIGN PATENT DOCUMENTS

FR   2677723 A1 * 12/1992
FR   2 917 713      12/2008

(Continued)

OTHER PUBLICATIONS

FR 2 677 723—(1) specification (english machine translation) and (2) Derwent summary.*

(Continued)

*Primary Examiner* — Tien Dinh
*Assistant Examiner* — Alexander V Giczy
(74) *Attorney, Agent, or Firm* — Oblon, McClelland, Maier & Neustadt, L.L.P.

(57) ABSTRACT

A suspension system including a front suspension plane located at an intermediate turboshaft engine casing and connecting same to a pylon, a rear suspension plane located at an exhaust casing of the turboshaft engine and connecting same to the pylon, and a failsafe intermediate suspension plane located between the front and rear planes and including at least one connecting rod connecting the turboshaft engine having a structural outer casing to the pylon, the connecting rod mounted on the turboshaft engine with a predetermined clearance that renders the connecting rod inoperable while the suspension system of the rear plane is operating. The connecting rod is advantageously arranged between the outer casing and the pylon, and an element made of a flexible material is combined with the connecting rod to create the predetermined clearance by an elastically deformable nature thereof.

8 Claims, 2 Drawing Sheets

(56) References Cited

U.S. PATENT DOCUMENTS

| | | | |
|---|---|---|---|
| 4,571,936 A | | 2/1986 | Nash et al. |
| 4,717,094 A | * | 1/1988 | Chee .................. 244/54 |
| 5,501,434 A | * | 3/1996 | McGuire ............. 267/140.11 |
| 5,782,078 A | * | 7/1998 | Brantley ............. 60/797 |
| 6,328,293 B1 | * | 12/2001 | Olsen ................ 267/140.11 |
| 7,331,627 B2 | * | 2/2008 | Van Den Brink et al. ............. 296/190.07 |
| 2001/0013678 A1 | | 8/2001 | McGuire |
| 2006/0273221 A1 | * | 12/2006 | Olsen et al. ........ 244/58 |
| 2007/0137956 A1 | * | 6/2007 | Stamps et al. ...... 188/316 |
| 2007/0246603 A1 | * | 10/2007 | Udall et al. ......... 244/54 |
| 2010/0116965 A1 | * | 5/2010 | McGuire ............. 248/557 |
| 2010/0181417 A1 | | 7/2010 | Combes et al. |

FOREIGN PATENT DOCUMENTS

| | | |
|---|---|---|
| GB | 1 236 917 | 6/1971 |
| WO | 99 06732 | 2/1999 |

OTHER PUBLICATIONS

International Search Report Issued Oct. 31, 2011 in PCT/FR11/051322 Filed Jun. 9, 2011.

U.S. Appl. No. 13/821,465, filed Mar. 7, 2013, Bellabal et al.

* cited by examiner

TURBOSHAFT ENGINE ATTACHED TO A PYLON OF THE FUSELAGE OF AN AIRCRAFT BY A FAILSAFE SUSPENSION SYSTEM

BACKGROUND OF THE INVENTION

1. Field of the Invention

The present invention concerns a suspension system for a turboshaft engine or similar at a pylon of an aircraft making it possible to ensure that said turboshaft engine is secured in total safety to the structure of the aircraft.

2. Description of the Related Art

The term suspension refers in a general manner to all the different parts necessary for securing the turboshaft engine to the pylon, such as notably the fastenings, articulations, axes, ball-and-socket joints, rods, arms, collars, fittings, etc. . . . that are usually found for this purpose.

In general, the suspension system is located and contained in specific planes of the turboshaft engine which are parallel to each other and at right angles with respect to the longitudinal axis of said turboshaft engine. In this way, it is made up by at least one front suspension plane located at an intermediate turboshaft engine casing and connecting same to the mounting beam in the pylon box, and by a rear suspension plane located at the exhaust casing of the turboshaft engine and connecting same to the beam of the pylon. Moreover, in addition to said two front and rear suspension planes, the suspension system as a whole includes thrust link means defined by rods when the turboshaft engine is attached under the wing of the aircraft as taught in document GB 1 236 917, or by an outer fan duct when the turboshaft engine is attached to the fuselage as claimed in the invention. The aim of the arrangement of the suspension system is notably to take up the forces exerted in the three directions or axes (roll, pitch, yaw) of an orthonormal frame of reference connected to the aircraft, as well as the momentums in said three axes.

Moreover, the invention concerns more particularly the safety of the suspension system made up notably by its front and rear planes. Therefore, in addition to the usual doubling of some of the parts listed above for the purposes of safety, the suspension system can include a so-called fail-safe supplementary suspension plane provided between the front and rear planes, in parallel with these latter. The aim of said intermediate suspension plane, in particular, is to take up the momentum of the forces around the yaw axis of the frame of reference (slippage momentum) in the event of a breakdown in the rear suspension system, notably when the turboshaft engine is located at the back of the fuselage of the aircraft, close to the wall thereof with the risk of said wall being perforated by fragments from the turboshaft engine and the suspension system. In this way, the turboshaft engine is held approximately in place in spite of said breakdown in the rear suspension system.

Said failsafe intermediate suspension system, disposed close to the rear suspension plane, includes a rod connecting the turboshaft engine to the beam of the pylon. The rod is mounted with sufficient clearance forming a free space so that no force passes through it while the rear suspension system remains operational and intact, such that the displacements and vibrations generated by the turboshaft engine during its operation and by the aircraft do not act on the rod. Said intermediate suspension plane is therefore on standby.

Although providing reinforced safety in the event of the rear suspension system breaking down, mounted in such a manner with clearance, in normal operation the connecting rod runs the risk of hitting the fastening with the turboshaft engine or the pylon due to the vibrations and other displacements produced and generated by the operation of same.

Moreover, at the time of installation, the engine being already supported by the suspension systems in a manner that is at least isostatic, the mounting of a classic standby supplementary rod calls for fine tolerances in the positioning thereof. Added to this is the restricted space between the turboshaft engine and the pylon which makes the mounting of the rod complicated.

BRIEF SUMMARY OF THE INVENTION

The object of the present invention is to remedy the above disadvantages and concerns a turboshaft engine attached to a pylon of the fuselage of an aircraft by means of a suspension system including, at right angles to the longitudinal axis of the turboshaft engine, a front suspension plane located at an intermediate turboshaft engine casing and connecting same to the pylon, a rear suspension plane located at the exhaust casing of the turboshaft engine and connecting same to the pylon, and a failsafe intermediate suspension plane located between the front and rear planes and comprising at least one connecting rod between the turboshaft engine having an outer fan duct and the pylon, said connecting rod being mounted on the turboshaft engine with a predetermined clearance that renders the connecting rod inoperable while the suspension system of the rear plane is operating. The turboshaft engine is distinguished, as claimed in the invention, by the fact that the connecting rod of the intermediate suspension plane is arranged between the outer fan duct and the pylon, and that an element made of a flexible material is associated with said connecting rod so as to introduce said predetermined clearance by means of the elastically deformable nature thereof.

In this way, the flexible element as claimed in the invention, the intrinsic elasticity of which determines the clearance, enables the rod to avoid coming directly into contact with the turboshaft engine and to be isolated from same while the rear suspension plane is operational, in spite of the vibrations generated. In effect, relative displacement between the two connection ends (attachment points to the turboshaft engine and the pylon of the fuselage) of the rod is made possible by means of the elastically deformable flexible element. A force passes through said rod, but its impact on the load limitations of the suspensions is negligible (in the order of 0.01%). In this way, the force passing through the rod of the third intermediate plane is sufficiently weak so as not to challenge the load limitations of the suspensions. In reverse, when the rear suspension plane fails, the safety clearance introduced by the flexible element is eliminated, the rod being in abutment between its two ends while playing its role of holding the turboshaft engine and taking up the slippage momentum.

The flexible material of the element is an elastomer or similar, for example, of the thermally resistant silicone type (<150° C.)

In a first embodiment, said flexible element introducing the predetermined clearance has a ring-shaped cylindrical form and is housed in one of the ends of the connecting rod, articulated at a complementary fastening of either the turboshaft engine or the pylon. The simplicity of the realization of the flexible element bestowing marked reliability on said flexible element is noted.

In a preferred manner, the end of the connecting rod carrying the ring-shaped flexible element is articulated about an axis at the lug of the fastening which is integral with the turboshaft engine, while the opposite end thereof is articulated by means of a ball-and-socket joint at a fastening of the pylon. The lug fastening is that of the outer fan duct of the turboshaft engine located on the rear fuselage of an airplane, and the arrangement of a ball-and-socket joint allows the rod to act along its axis.

In an advantageous manner, the connecting rod can be dismantled and is made up by two distinct parts which are respectively articulated at the turboshaft engine and at the pylon and are connected together in an axially adjustable manner. In this way, not only does this facilitate the mounting of the rod in the confined space between the turboshaft engine and the pylon, but it also allows the center distance of the rod to be adapted perfectly to the distance separating the corresponding fastenings of the turboshaft engine and of the pylon.

For example, the aligned and adjustable connection between the two parts of the rod is obtained by means of an outer threaded ring surrounding the ends facing the two parts of the rod.

In a second embodiment, said flexible element introducing the predetermined clearance is incorporated in the connecting rod so as to allow a free variation in the length of same, corresponding to the predetermined clearance. In this way, the relative displacement between the ends of the rod, without putting said rod in abutment, whilst the rear suspension plane is active, is supplied by the flexible element with axial movement in parallel with the rod. A force passes through said rod, but its impact on the load limitations of the suspensions is negligible (in the order of 0.01%). In this way, the force passing through the rod of the third intermediate plane is sufficiently weak so as not to challenge the load limitations of the suspensions.

The length of the rod is therefore always adapted to the distance separating the fastenings of the engine and of the pylon.

In the second embodiment, the connecting rod is made up therefore by two telescopic tubular parts, between which is arranged the flexible element with the ring-shaped cylindrical form and which are articulated at their opposite ends at the turboshaft engine and at the pylon respectively.

In particular, the flexible element can be in the form of concentric cylindrical layers allowing the two tubular parts to slide freely in an axial manner with respect to each other and allowing the variation in the length of the rod, corresponding to the desired predetermined clearance, between the axial stops provided on said parts. The layers can be obtained by means of rolling the flexible element in the form of a band or by means of several sleeves nested into each other in order to form the flexible element with multiple concentric layers.

Equally, in order to facilitate the mounting of the rod and its adjustment, at least one of the tubular parts of the connecting rod can be dismantled and is made up by an end sub-part capable of being attached to a fastening of the turboshaft engine and by a ring-shaped lateral wall sub-part, said end and wall sub-parts being connected to each other by an outer threaded ring.

BRIEF DESCRIPTION OF THE SEVERAL VIEWS OF THE DRAWINGS

How the invention is realized will become clear from the figures of the accompanying drawing. In said figures, identical references designate similar elements.

DETAILED DESCRIPTION OF THE INVENTION

Figure 1:
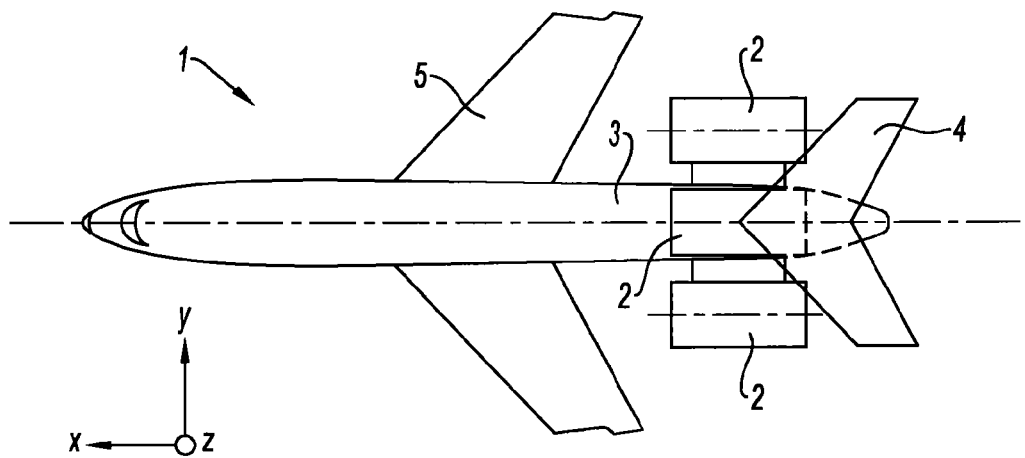
FIG. 1 is a top view of an aircraft provided with turboshaft engines located at the back of the fuselage thereof.

The aircraft 1 shown in top view in FIG. 1 includes, for its thrust, turboshaft engines 2 (such as turbojets) which are preferably, as claimed in the invention, mounted along the fuselage 3 of the aircraft, at the back of same, respectively on both sides of the longitudinal plane of symmetry of the aircraft and above the fuselage close to the rear empennage 4 in said plane.

Obviously, the invention could apply to turboshaft engines located under the wings of the aircraft; however, it is intended more for turboshaft engines set up at the fuselage of the aircraft because of the consequences of a breakdown in the rear suspension system as has been stated beforehand.

Therefore, in order to ensure the mounting and the fastening of each turboshaft engine to the fuselage, a suspension system 6 is provided acting as an interface between the latter. To do this, as shown schematically in FIGS. 1 and 2, the suspension system 6 is arranged between a reinforcement pylon 7 with a boxed mounting beam, which is integral with the structural wall of the fuselage 3, and outer casings or similar 8, 9 of the turboshaft engine. In general, the suspension system 6 is present in the front suspension plane P1 and the rear suspension plane P2, which are parallel with respect to each other and at right angles with respect to the longitudinal axis of the turboshaft engine. Compared to an orthonormal frame of reference XYZ, corresponding to that of the aircraft 1 with X as the roll axis, Y as the pitch axis and Z as the yaw axis, the longitudinal axis of each turboshaft engine is parallel to X and will be designated identically, and the front suspension plane P1 and the rear suspension plane P2 are thus included in the planes formed by the axes Y and Z.

Usually, the front suspension plane P1 is located at the turboshaft engine 2 intermediate casing 8 downstream of the turbofan and the rear suspension plane P2, in turn, is located at the ring-shaped casing 9 connected to and surrounding the exhaust casing of the turboshaft engine 2. The front suspension system and the rear suspension system forming the overall suspension system 6 are symbolized by means of respective rectangles 6.1, 6.2 (FIGS. 2 and 3) connecting the relevant casings (or streamlined bodies) of the turboshaft engine to the mounting beam of the pylon, and the parts (such as listed beforehand) which go to make them are not shown since they are not part of the invention and are well known in this area (see the numerous patents of the applicant in this regard).

The suspension system 6, moreover, has a so-called "failsafe" third intermediate suspension plane P3. Said suspension plane P3 is intended to remedy the failure of the rear suspension system and is therefore in parallel with and close to the rear suspension plane P2.

As stated beforehand, in the event of the rear suspension system breaking down, it is necessary notably to take up the momentum in relation to the Z axis, designated as the slippage momentum and, to do this, the intermediate suspension system 6.3, initially erased ("on standby" and shown by the dotted line in FIG. 2) whilst the rear suspension plane is operational, becomes active (shown by the solid line in FIG.

3). (This is true for engines located on both sides of the fuselage. For the engine located above, it is expedient to replace Z by Y and "slippage momentum" by "pitch momentum").

Figure 4:
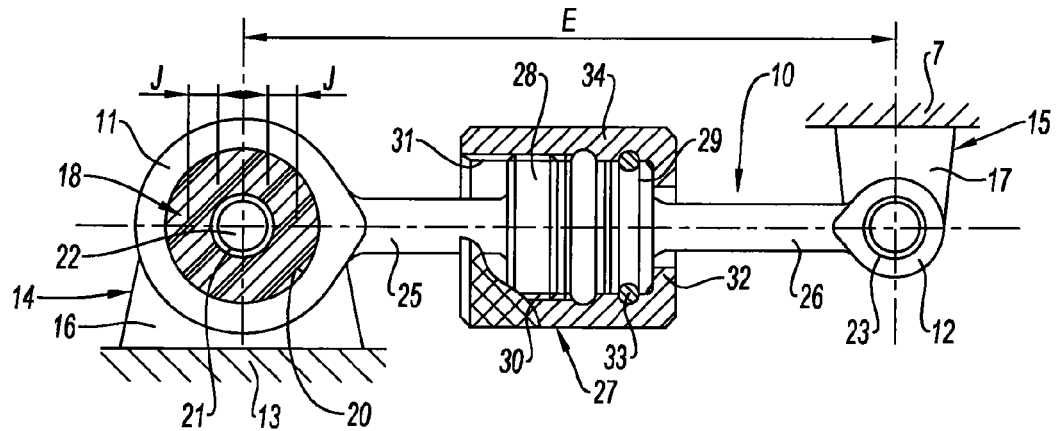
FIG. 4 shows an axial section of a first embodiment of the connecting rod of the intermediate suspension plane with the failsafe suspension system.
Figure 5:
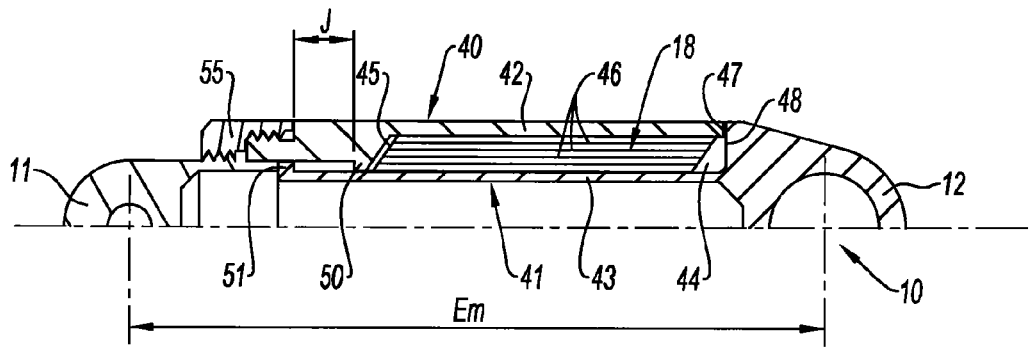
FIGS. 5 and 6 show axial half-sections of a second embodiment of the connecting rod respectively in the minimum and maximum axial extension positions thereof.
Figure 6:
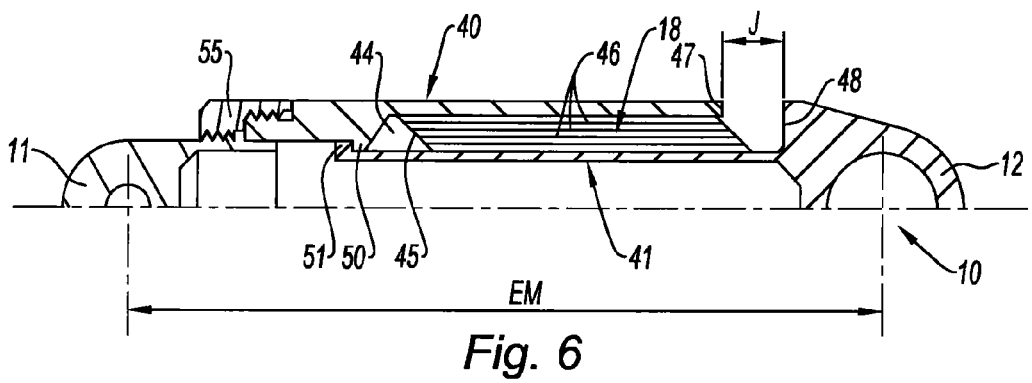

As shown in FIGS. 4, 5 and 6, the intermediate suspension system 6.3 has the structural form of a connecting rod 10 arranged in the YZ plane and connecting, by way of its opposite ends 11 and 12, the fastenings 14 and 15 situated respectively on an outer fan duct 13 of the turboshaft engine 2, connecting the casings 8 and 9, and on the beam of the pylon 7 which is integral with the fuselage. Said fastenings, for example, are respectively lugs 16 and 17 such as illustrated in FIG. 4.

The connecting rod 10, in relation to the turboshaft engine and to the pylon, is mounted with an axial clearance so that no force passes through it whilst the rear suspension plane P2 remains intact, that is to say ensures its operation normally. Said "fail-safe" axial clearance allows, on the one hand, the rod 10 to be able to move axially between the two ends 11, 12 thereof connected to the fastenings 14, 15 without becoming active and, therefore, without taking up any forces, and thus to be in the standby position. On the other hand, it allows said rod to absorb the vibrations and displacements caused notably by the movement of the propulsive assembly (turboshaft engine) in relation to the airplane.

In a first embodiment shown in FIG. 4, an elastically deformable, flexible element 18 is arranged at one of the ends 11 and 12 of the connecting rod 10, which ends terminate in the usual manner in a ring-shaped cylindrical form as an eyelet. The distance separating the centers of the ring-shaped ends 11, 12 defines the center distance E of the rod 10. In FIG. 4, it can be seen that the flexible element 18 is arranged in the ring-shaped end 11 of the rod 10 which co-operates with the fastening 14 with the lug 16 of the corresponding casing 13 of the turboshaft engine 2. Therefore structurally, said flexible element 18 has a ring-shaped cylindrical form becoming integrated between the inner lateral surface 20 of the ring-shaped end 11 and the outer lateral surface 21 of the cylindrical articulation axis 22 connecting the lug 16 to the end 11.

The material used to realize the flexible element 18 is, for example, a silicone based elastomer, notably capable of thermally resisting variations in temperature. The intrinsic elasticity of the flexible element supplied by the material introduces the fail-safe clearance J necessary in order to isolate the rod and avoid loading it whilst the rear suspension plane P2 is operational. FIG. 4 shows an example of the fail-safe clearance J introduced by the flexible element allowing for the variation in the center distance E of the rod without loading the same, and for the absorption of the vibrations and other displacements when the plane P2 is intact.

The opposite end 12 of the rod 10 also ends in a ring-shaped cylindrical form and it is articulated at the lug 17 of the corresponding fastening 15 of the pylon by means of a ball-and-socket joint 23, allowing force to be passed into the longitudinal axis of the rod 10 when this proves necessary, following a breakdown in the rear suspension system 6.2.

In this way, the relative displacement between the two ends 11 and 12 of the rod 10 by means of variation in the center distance E thereof (centers of the connection between ends and corresponding lugs) is permitted thanks to the elasticity of the flexible element, introducing the fail-safe clearance J, such that no significant force passes through the connecting rod when the plane P2 is active.

Moreover, said rod 10 is advantageously realized in two distinct parts 25, 26 which are cylindrical and connected together in a coaxial manner by an outer threaded ring 27. The length of the two parts 25 and 26 is approximately identical and they each terminate, at the one end, by means of the corresponding ring-shaped end 11, 12 and, at the other end, by means of an outer transverse shoulder 28, 29, the two facing shoulders being received in the threaded ring 27.

In particular, the part 25 with the end 11 with the flexible element 18 has, at the lateral periphery of the shoulder thereof, a thread 30 capable of cooperating with a corresponding female thread 31 on the outer ring. The other part 26 of the rod 10, with the ring-shaped end 12 with the ball-and-socket joint 23, has the transverse shoulder 29 thereof abutting against a transverse bottom 32 of the ring while being axially held one against the other by an intermediate ring 33 between the shoulder 29 and the cylindrical lateral wall 34 of the outer ring 27.

The screw-connecting of the latter by means of the female thread 31 thereof on the thread 30 of the shoulder 28 of the part 25 allows the center distance E of the rod 10 to be adjusted perfectly in terms of the gap between the lugs 16, 17 of the fastenings 14, 15 provided on the turboshaft engine 2 and the pylon 7. In addition to said adjustment possibility, the composite nature of the rod 10 in two approximately equal parts 25, 26 greatly facilitates the mounting thereof (and the dismantling thereof) in the restricted space between the relevant casing of the turboshaft engine and the beam of the pylon. Each part 25 and 26 can be connected separately to its fastening, then, afterwards, they are joined again coaxially with the appropriate center distance E by means of the threaded ring 27 which is milled on the outside.

Figure 7:
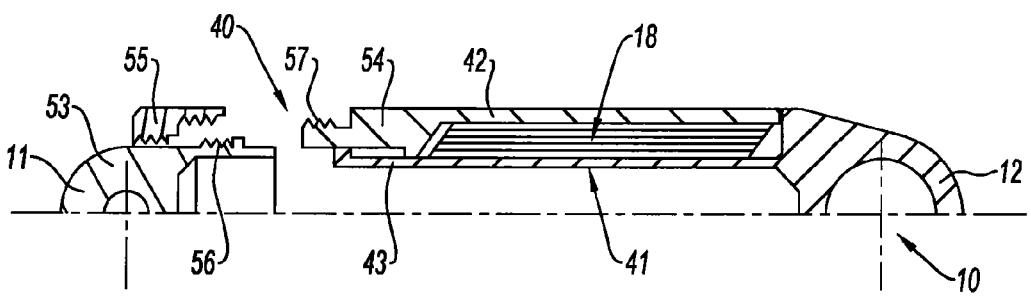
FIG. 7 also shows an axial half-section of the dismantled rod of the second embodiment.

In the second embodiment shown in FIGS. 5, 6 and 7, instead of maintaining the clearance J by means of the flexible element 18 between one of the lugs of the fastenings and the corresponding articulation axis, the fail-safe axial clearance J is integrated directly in the connecting rod 10, allowing it to vary the length thereof (center distance E) within the predetermined clearance, without passing any force whatsoever through it.

To this end, in this case too the connecting rod 10 is made up of two distinct parts 40, 41, but here they are arranged together telescopically in a coaxial manner. A first outer tubular part 40 is defined in order to end in the ring-shaped end 11 capable of being articulated at the lug 16 (not shown) of the fastening of the casing of the turboshaft engine 2. A second inner cylindrical part 41, preferably tubular because of the gain in mass, is engaged in the first tubular part 40 and ends in the other ring-shaped end 12 capable of being articulated at the lug 17 (not shown) of the fastening of the pylon 7. The articulations (not shown) of the ends at the lugs are, for example, of the type with a cylindrical axis and a ball-and-socket, even with two ball-and-socket joints.

Between the lateral walls 42, 43 of the two parts, the outer 40 and the inner 41 part, there is provided a ring-shaped intermediate space 44 in which is arranged the flexible element 18 which will allow for the variation in the center distance E of the rod 10 between the centers of the ends 11 and 12 thereof. The flexible element 18 is therefore in the form of a ring-shaped cylindrical sleeve 45 accommodated in the intermediate space 44 over a major part of the length thereof and joined in a fixed manner on the facing surfaces of the lateral walls 42, 43 of the parts 40 and 41. To obtain the desired axial flexibility and the free sliding of the rod 10 without any force passing through same, besides the choice of the material of elastomer, the sleeved element 45 is formed by several concentric ring-shaped layers 46 (five, for example, are shown in FIGS. 5 to 7). Said layers are either independent of each other by being nested successively into each other or are obtained by the rolling of a band up to the desired number of layers making up the element 18.

In the position of the connecting rod 10 with minimum center distance Em between its ends 11, 12, as shown in FIG. 5, it is possible to see the fail-safe axial clearance J made possible between the two parts 40 and 41 of the rod 10 by means of the sleeved element 45, now deformed in terms of shear to the maximum on one side. To this end, a transverse face 47, for example of the tubular outer part, abuts against a shoulder 48 of the inner part. The maximum clearance J introduced by the flexibility of the element is therefore situated between two ring-shaped shoulders, respectively the outer shoulder 50 and the inner shoulder 51, of the distinct parts 40 and 41, spaced from each other and opposed to contact by abutment of the transverse face 47 and of the relevant shoulder 48.

Conversely, in the position of the connecting rod 10 with maximum center distance EM, as shown in FIG. 6, the sleeved element 45 is therefore deformed in terms of shear to the maximum on the other side. In this case, the shoulders 50 and 51 abut axially against each other, and the transverse face 47 of the outer part 40 is situated far away from the shoulder 48 of the inner part 41 while defining the clearance J.

Said two limit positions (FIGS. 5 and 6) determine the fail-safe axial clearance J introduced by the sleeved 45 flexible element 18. In this way, the length of the connecting rod 10 can vary between said positions without subjecting the rod to any force whatsoever while the rear suspension plane P2 is active, and is always adapted to the gap between the respective fastenings 14, 15 in spite of the vibrations of the propulsive assembly, up until the rod returns in abutment.

Figure 2:
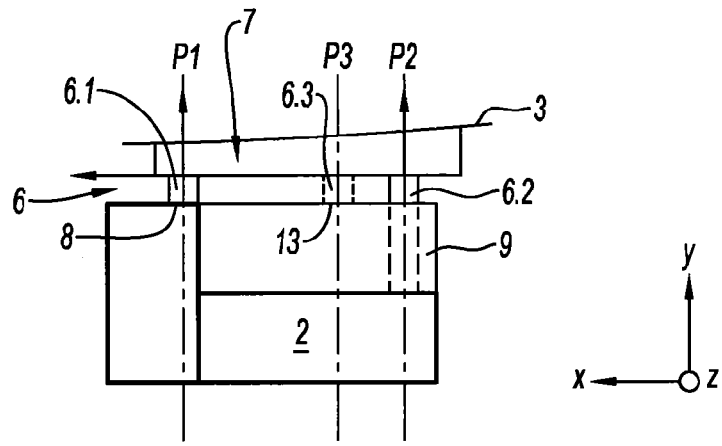
FIGS. 2 and 3 show schematic representations of one of the turboshaft engines of the aircraft attached to the mounting pylon of the fuselage by means of the suspension of the invention, respectively without and with a breakdown in the rear suspension plane.

In normal operation, that is to say with a rear suspension plane P2 operational as in FIG. 2 (with the arrow symbolizing the forces in P2), the intermediate suspension plane P3 is inert and the suspension system thereof 6.3, for this purpose, is represented by the rectangle shown by the dotted line. The rod 10, although being able to move around axially within the clearance supplied by the flexible element, does not contribute to taking up any force whatsoever and is considered as being on standby, inactive. The flexible element 18, stressed in terms of compression/tension (FIG. 4) or in terms of shear (FIGS. 5 and 6) is freely deformed and absorbs the imposed displacements and/or vibrations caused notably by the operation of the propulsive assembly. As a result, the length of the rod 10 (center distance) is adapted to the variable distance between the fastenings of the relevant outer casing 13 of the turboshaft engine 1 and of the beam of the pylon 7.

Figure 3:
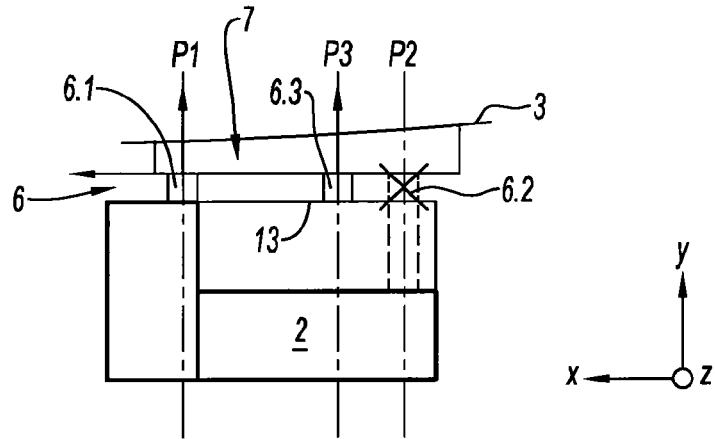

In the event of the suspension system 6.2 of the rear plane P2 breaking down, in this case shown by the dotted line with a cross in FIG. 3, the suspension system 6.3 of the third intermediate plane P3 acts, being indicated by a rectangle in a solid line in said figure (with the arrow symbolizing the forces in P3). The rod 10 enters into abutment by eliminating the fail-safe axial clearance J introduced by the elastically deformable flexible element 18. The forces run through and are taken up by the connecting rod 10 by being transmitted by means of the different contact zones (articulations, shoulders and transverse faces forming abutment, etc. . . . ) of the rod and into the axis of same. In this way, the slippage momentum in relation to Z is taken up allowing the turboshaft engine 2 to be better held.

Moreover, it is also noted that the connecting rod 10 of said second embodiment can be dismantled. To this end, the tubular outer part 40, for example, is made up of two sub-parts, a first sub-part 54 corresponding to the outer lateral wall 42 connected to that 43 of the inner part 41 by means of the sleeved flexible element 45, and a second sub-part 53 corresponding to the ring-shaped end 11. In this case too, said two sub-parts 53 and 54 are assembled together by means of a milled threaded ring 55 being screw-connected, on the one hand, on a thread 56 of the end 11 (sub-part 53) and, on the other hand, on a thread 57 at the end of the lateral wall 42 (sub-part 54). Once screw-connected, the ring 55 places the two sub-parts 53, 54 in axial abutment. In this way, the mounting and the dismantling of the rod 10 are made easier for the aforesaid reasons.

In short, such a rod with an elastically deformable flexible element arranged in the intermediate plane allows a "fail-safe standby path" to be defined between the two distant points of the rod, the vibrations to be deadened and mounting on the engines to be facilitated and, when the rear suspension plane breaks down, the relevant engine to be supported.

The invention claimed is:

1. A turboshaft engine attached to a pylon of a fuselage of an aircraft by a suspension system comprising:
    a front suspension system provided at a front suspension plane perpendicular to a longitudinal axis of the turboshaft engine and located at an intermediate turboshaft engine casing, the front suspension system connecting the turboshaft engine casing to the pylon;
    a rear suspension system provided at a rear suspension plane perpendicular to the longitudinal axis of the turboshaft engine and located at an exhaust casing of the turboshaft engine, the rear suspension system connecting the exhaust casing to the pylon; and
    a failsafe intermediate suspension system provided at a failsafe intermediate suspension plane perpendicular to the longitudinal axis of the turboshaft engine and located between the front and rear suspension planes, the intermediate suspension plane being closer to the rear suspension plane than the front suspension plane, the intermediate suspension system comprising at least one connecting rod with a first end connected to a first fastening provided on an outer fan duct of the turboshaft engine and a second end connected to a second fastening provided on the pylon so as to present a center distance between a center of the first end and a center of the second end in an axial direction of the connecting rod,
    wherein the connecting rod is movable within a predetermined clearance in the axial direction when the rear suspension system of the rear plane is operating and the connecting rod is in a standby position so that the center distance can vary,
    wherein a flexible element made of a flexible material is provided in the connecting rod so as to introduce the predetermined clearance by an elastically deformable nature of the flexible element so that the center distance can vary when the rear suspension system is operating and the connecting rod is in the standby position, and
    wherein the connecting rod can be disassembled and includes at least first and second distinct parts that are respectively articulated at the turboshaft engine and at the pylon and are connected together in an axially adjustable manner via a single outer threaded ring surrounding facing ends of the first and second distinct parts of the rod.

2. The turboshaft engine as claimed in claim 1, wherein the flexible material of the element is an elastomer.

3. The turboshaft engine as claimed in claim 1, wherein the flexible element introducing the predetermined clearance includes a ring-shaped cylindrical form and is housed in one of the ends of the connecting rod, articulated at a complementary fastening of either the turboshaft engine or the pylon.

4. The turboshaft engine as claimed in claim 3, wherein the first end of the connecting rod carrying the ring-shaped flexible element is articulated about an axis at a lug of the first fastening that is integral with the turboshaft engine, while the second end of the connecting rod is articulated by a ball-and-socket joint at the second fastening on the pylon.

5. The turboshaft engine as claimed in claim 1, wherein the connecting rod includes first and second telescopic tubular parts between which is arranged the flexible element with a ring-shaped cylindrical form, and opposite ends of the first and second telescopic tubular parts are articulated at the turboshaft engine and at the pylon respectively.

6. The turboshaft engine as claimed in claim 5, wherein the flexible element is in a form of concentric cylindrical layers allowing the first and second telescopic tubular parts to slide freely axially with respect to each other and allowing variation in the length of the connecting rod, corresponding to the predetermined clearance, between axial stops provided on the first and second telescopic tubular parts.

7. The turboshaft engine as claimed in claim 5, wherein the flexible element is integrated between an inner lateral surface of the first end of the connecting rod having a ring shape and an outer lateral surface of a cylindrical articulation axis connecting a first lug of the first fastening to the first end of the connecting rod.

8. The turboshaft engine as claimed in claim 5, wherein the axial stops include a transverse face of the first telescopic tubular part and a shoulder of the second telescopic tubular part, and an outer shoulder of the first telescopic tubular part and an inner shoulder of the second telescopic tubular part.

* * * * *